(12) United States Patent
Vyshedskiy et al.

(10) Patent No.: US 11,308,819 B2
(45) Date of Patent: Apr. 19, 2022

(54) METHOD OF IMPROVING COGNITIVE ABILITIES

(71) Applicant: ImagiRation, LLC, Boston, MA (US)

(72) Inventors: Andrey Vyshedskiy, Boston, MA (US); Rita Dunn, Waltham, MA (US)

(73) Assignee: Imagination, LLC, Dover, DE (US)

( * ) Notice: Subject to any disclaimer, the term of this patent is extended or adjusted under 35 U.S.C. 154(b) by 0 days.

(21) Appl. No.: 15/002,393

(22) Filed: Jan. 20, 2016

(65) Prior Publication Data

US 2016/0210870 A1 Jul. 21, 2016

Related U.S. Application Data

(60) Provisional application No. 62/125,262, filed on Jan. 20, 2015, provisional application No. 62/125,261, filed on Jan. 20, 2015.

(51) Int. Cl.
*G09B 5/02* (2006.01)

(52) U.S. Cl.
CPC .................... *G09B 5/02* (2013.01)

(58) Field of Classification Search
CPC ... A63F 9/0612; G06F 17/30259; G09B 5/02; G07F 17/3295
See application file for complete search history.

(56) References Cited

U.S. PATENT DOCUMENTS

| | | | |
|---|---|---|---|
| 5,855,483 A * | 1/1999 | Collins | A63F 3/00643 434/322 |
| 9,114,313 B2 * | 8/2015 | Weed | A63F 9/0612 |
| 9,308,446 B1 * | 4/2016 | Merzenich | G09B 19/00 |
| 9,795,869 B2 * | 10/2017 | Brazier | G09B 7/00 |
| 2004/0002043 A1 * | 1/2004 | Dowrick | G09B 5/06 434/178 |
| 2004/0224775 A1 * | 11/2004 | Wood | A63F 13/08 463/43 |
| 2008/0070682 A1 * | 3/2008 | Woody | A63F 13/06 463/30 |
| 2010/0304348 A1 * | 12/2010 | Lehavi | G09B 7/02 434/322 |
| 2012/0100518 A1 * | 4/2012 | Yang | G09B 5/00 434/307 R |
| 2012/0258436 A1 * | 10/2012 | Lee | G09B 19/00 434/362 |

(Continued)

OTHER PUBLICATIONS

HFS, I Spy School Days, Apr. 4, 2012, Youtube.com, pp. 1-3, at https://www.youtube.com/watch?v=thiA-F0HDio, (last visited Aug. 5, 2020). (Year: 2012).*

(Continued)

*Primary Examiner* — Steve Rowland
(74) *Attorney, Agent, or Firm* — IRL Legal Services, LLC; Ilya R. Lapshin

(57) ABSTRACT

An early intervention application that flexibly delivers a set curriculum of automated lessons based on research about childhood development. The software also has the ability to monitor and analyze the child's progress on a daily basis. It contains exercises specially designed to improve a child's ability to integrate multiple cues. Such training has been shown to transfer, over time, to the acquisition of a full syntactic language, and ultimately to the individual's ability to engage with the world and lead a productive, independent life.

5 Claims, 7 Drawing Sheets

(56) References Cited

U.S. PATENT DOCUMENTS

| | | | |
|---|---|---|---|
| 2012/0302337 A1* | 11/2012 | Thakkar | A63F 13/12 463/31 |
| 2012/0315967 A1* | 12/2012 | Watine | A63F 1/04 463/9 |
| 2014/0274243 A1* | 9/2014 | Lopez | A63F 13/67 463/9 |

OTHER PUBLICATIONS

Clément Marty, Guess Who?, May 7, 2013, Youtube.com, pp. 1-3, at https://www.youtube.com/watch?v=NMtV9ufmOUs, (last visited Aug. 5, 2020). (Year: 2013).*

Clement Marty, Guess Who?, May 7, 2013, Youtube.com, pp. 1-3, at https://www.youtube.com/watch?v=NMtV9ufmOUs, (last visited Mar. 22, 2021). (Year: 2012).*

Wilczynski, S., Green, G., Ricciardi, J., Boyd, B., Hume, A., Ladd, M., & Rue, H. (2009). National standards report: The national standards project: Addressing the need for evidence-based practice guidelines for autism spectrum disorders. Randolph, MA: The National Autism Center.

Lovaas, O. Ivar, Robert L. Koegel, and Laura Schreibman. "Stimulus overselectivity in autism: A review of research." Psychological bulletin 86.6 (1979): 1236.

Schreibman, Laura. "Diagnostic features of autism." Journal of child neurology 3.1 suppl (1988): S57-S64.

Koegel, L. K., Koegel, R. L., Narrower, J. K., & Carter, C. M. (1999). Pivotal response intervention I: Overview of approach. Research and Practice for Persons with Severe Disabilities, 24(3), 174-185.

Burke, John C., and Laurie Cerniglia. "Stimulus complexity and autistic children's responsivity: Assessing and training a pivotal behavior." Journal of Autism and Developmental Disorders 20.2 (1990): 233-253.

Ploog, Bertram O. "Stimulus overselectivity four decades later: A review of the literature and its implications for current research in autism speclrum disorder" Journal of autism and developmental disorders 40.11 (2010): 1332-1349.

Smith, Tristram, et al. "Intensive behavioral treatment for preschoolers with severe mental retardation and pervasive developmental disorder." American Journal on Mental Retardation 102.3 (1997): 238-249.

Hume, Kara, Scott Bellini, and Cathy Pratt. "The usage and perceived outcomes of early intervention and early childhood programs for young children with autism spectrum disorder." Topics in Early Childhood Special Education 25.4 (2005): 195-207.

Mazurek, Micah O., et al. "Prevalence and correlates of screen-based media use among youths with autism spectrum disorders." Journal of autism and developmental disorders 42.8 (2012): 1757-1767.

Wingate, M., Kirby, R. S., Pettygrove, S., Cunniff, C., Schulz, E., Ghosh, T., . . . & Yeargin-Allsopp, M. (2014). Prevalence of autism spectrum disorder among children aged 8 years-autism and developmental disabilities monitoring network, 11 sites, United States, 2010. MMWR Surveillance Summaries, 63(2).

Landa, R. J., Gross, A. L., Stuart, E. A., & Bauman, M. (2012). Latent class analysis of early developmental trajectory n baby siblings of children with autism Journal of Child Psychology and Psychiatry, 53(9), 986-996.

Ozonoff, S., Iosif, A. M., Baguio, F., Cook, I. C., Hill, M. M., Hutman, T., . . . & Young, G. S. (2010). A prospective study of the emergence of early behavioral signs of autism. Journal of the American Academy of Child & Adolescent Psychiatry, 49(3), 256-266.

Rogers, S. J., Vismara, L., Wagner, A. L., McCormick, C., Young, G., & Ozonoff, S. (2014). Autism treatment in the first year of life: A pilot study of infant start, a parent-implemented intervention for symptomatic infants. Journal of autism and developmental disorders, 44(12), 2981-2995.

Eldevik, S., Hastings, R. P., Hughes, J. C., Jahr, E., Eikeseth, S., & Cross, S. (2010). Using participant data to extend the evidence base for intensive behavioral intervention for children with autism. American Journal on Intellectual and Developmental Disabilities, 115(5), 381-405.

Peters-Scheffer, N., Didden, R., Korzilius, H., & Sturmey, P. (2011). A meta-analytic study on the effectiveness of comprehensive ABA-based early intervention programs for children with autism spectrum disorders. Research in Autism Spectrum Disorders, 5(1), 60-69.

Virés-Ortega, J. (2010). Applied behavior analytic intervention for autism in early childhood: Meta-analysis, metaregression and dose-response meta-analysis of multiple outcomes. Clinical psychology review, 30(4), 387-399.

Maglione, M. A., Gans, D., Das, L., Timbie, J., & Kasari, C. (2012). Nonmedical interventions for children with ASD: Recommended guidelines and further research needs. Pediatrics, 130(Supplement 2), S169-S178.

Johnson, E., & Hastings, R. P. (2002). Facilitating factors and barriers to the implementation of intensive home-based behavioural intervention for young children with autism. Child: Care, Health and Development, 28(2), 123-129.

Bibby, P., Eikeseth, S., Martin, N. T., Mudford, O. C., & Reeves, D. (2002). Progress and outcomes for children with autism receiving parent-managed intensive interventions Research in Developmental Disabilities, 23(1), 81-104.

Jacobson, J. W. (2000). Early intensive behavioral intervention: Emergence of a consumer-driven service model. The Behavior Analyst, 23(2), 149.

Wise, M. D., Little, A. A., Holliman, J. B., Wise, P. H., & Wang, C. J. (2010). Can state early intervention programs meet the increased demand of children suspected of having autism spectrum disorders?. Journal of Developmental & Behavioral Pediatrics, 31(6), 469-476.

Shukla-Mehta, S., Miller, T., & Callahan, K. J. (2009). Evaluating the effectiveness of video instruction on social and communication skills training for children with autism spectrum disorders: A review of the literature. Focus on Autism and Other Developmental Disabilities.

Bernard-Opitz, V., Sriram, N., & Nakhoda-Sapuan, S. (2001). Enhancing social problem solving in children with autism and normal children through computer-assisted instruction. Journal of autism and developmental disorders, 31(4), 377-384.

Schreibman, L., Whalen, C., & Stahmer, A. C. (2000). The use of video priming to reduce disruptive transition behavior n children with autism. Journal of positive behavior interventions, 2(1), 3-11.

Jowett, E. L., Moore, D. W., & Anderson, A. (2012). Using an iPad-based video modeling package to teach numeracy skills to a child with an autism spectrum disorder. Developmental Neurorehabilitation, 15(4), 304-312.

Kagohara, D. M., Sigafoos, J., Achmadi, D., O'Reilly, M., & Lancioni, G. (2012). Teaching children with autism spectrum disorders to check the spelling of words. Research in Autism Spectrum Disorders, 6(1), 304-310.

Ashley Harrell, iHelp for Autism, SFWeekly, Aug. 11, 2010.

Lovaas, O. I., Schreibman, L., Koegel, R., & Rehm, R. (1971). Selective responding by autistic children to multiple sensory input. Journal of Abnormal Psychology, 77(3), 211.

Yoder, P. J., & Lieberman, R. G. (2010). Two years of Early Start Denver Model reduces cognitive and language impairments in very young children with autism spectrum disorders. Evidence-based Communication Assessment and Intervention, 4(3), 120-123.

Hiniker, A., Daniels, J. W., & Williamson, H. (Jun. 2013). Go go games: therapeutic video games for children with autism spectrum disorders. In Proceedings of the 12th International Conference on Interaction Design and Children (pp. 463-466). ACM.

* cited by examiner

Target:   Options:

Target:   Options:

METHOD OF IMPROVING COGNITIVE ABILITIES

RELATED APPLICATIONS

This application claims the benefit under 35 USC 119(e) of U.S. Provisional Applications No. 62/125,261, filed on Jan. 20, 2015, and No. 62/125,262, filed on Jan. 20, 2015, which are incorporated herein by reference in their entirety.

BACKGROUND OF THE INVENTION

The Centers for Disease Control estimates that autism spectrum disorder (ASD) affects 1 in 68 children. Lifelong treatment of a single child with ASD costs society an estimated $3 million, and more often than not does little to help the child acquire a full syntactic language.

The failure to provide adequate early intervention services ends up costing society (USA) an estimated $126 billion per year. Recently, there has been some incredibly exciting and promising research in the field of early autism screening and treatment. ASD is usually diagnosed no earlier than age 2, though several groups have demonstrated that symptoms of ASD begin to manifest between 6 and 12 months of age, allowing for earlier screening. The advantage of earlier screening, of course, is earlier treatment, and some research has shown remarkable success with interventions aimed at infants. However, no matter when the diagnosis occurs, there is broad scientific consensus that early and intensive behavioral intervention has the greatest chance of significantly improving outcomes, sometimes even resulting in a complete loss of diagnosis.

The American Academy of Pediatrics (AAP) recommends that individuals with ASD begin to receive no less than 25 hours per week of treatment within 60 days of identification. Unfortunately, there are major problems with the availability, quality, and general funding for early intervention programs. Families of newly diagnosed children often face lengthy waitlists for therapy, which means children are left without treatment during the most critical, early period of development. Despite the AAP recommendation, two-thirds of US children on the autism spectrum under the age of 8 fail to meet even the minimum recommended treatment, and this immense shortage disproportionally affects African American and Latino children.

The use of technology in the delivery of much needed therapy promises to be effective for shrinking the gap between the therapy that is recommended for children with ASD and the amount they receive. Recently, there has been a promising trend towards computer-based interventions which capitalize on the often observed preference children with ASD show for flat screen information as well as evidence suggesting that tablets specifically have been a great learning tool for children with autism.

The ability to notice and respond to simultaneous multiple cues is highly developed in individuals not afflicted by ASD well before the age of 6, but it is known to be a common challenge for children on the spectrum. Children with ASD often focus on only one cue at a time while ignoring other cues, a characteristic that has been called stimulus overselectivity or "tunnel vision". This phenomenon, which was first described in 1971 by Lovaas, Schreibman, and Koegel, can have a profound effect on virtually every area of functioning. For example, an individual may have a difficult time differentiating between a fork and a spoon, or between the letters E and F, because of a tendency to hyper-attend to one aspect of the objects, such as the similar color of the utensils or the common vertical line in the two letters, ignoring other salient features. For example, when asked to pick up a long red stick, the child may pick up a short red stick or a long white stick, but would often fail to attend to both cues (length and color) and would therefore be unable to successfully complete the task. When asked to pick up a red crayon under the table, a child with ASD may hyper-attend to the cue "crayon" and ignore both its location and the fact that it should also be red. The child may therefore pick up any available crayon, failing to attend to the cues of color and location. The consequence of attempting to navigate the world with an impaired ability to respond to multiple cues are profound and can affect virtually every area of functioning.

Naturally, this impairment extends to the comprehension of the basic elements of language such as spatial prepositions (the crayon on the table vs. the crayon under the table), syntax (the boy chases the dog vs. the dog chases the boy), verb tenses (the boy chased the dog vs. the boy was chased by the dog), and adjectives (the red crayon vs. the green crayon).

Using Pivotal Response Training (PRT) to develop responsiveness to multiple cues has been shown to reduce the stimulus overselectivity and, most importantly, to lead to improvements in general learning. PRT is a naturalistic intervention that targets key, or "pivotal," areas of development that, in turn, affect a wide range of behaviors.

Currently, training to develop responsiveness to multiple cues (also known as multistep directions training) is provided by behavioral therapists. The PRT practitioner deliberately structures the natural environment such that a child must notice multiple cues simultaneously. However, the children aren't getting enough of the prescribed therapy. For more than a decade, it has been recommended that children with ASD receive between 25 and 40 hours of behavioral therapy per week, yet in the United States, two-thirds of children on the autism spectrum under the age of 8 fail to meet even the lower bound of this recommendation. Computerized brain training is an effective medium for shrinking the gap between the amount of behavioral therapy that is recommended for children with ASD and the amount they receive. A 2011 national survey showed that 41% of U.S. children with autism are heavy-use gamers, meaning that they spend most of their free time playing video games. This is more than twice the rate of heavy gaming in their typically developing peers.

SUMMARY OF THE INVENTION

This invention concerns an automated system for facilitating acquisition of full syntactic language through the process of interacting with visual objects on a computer screen in children with language delay. The invention includes a unique, early intervention application that flexibly delivers a set curriculum of automated lessons based on research about childhood development. The software also has the ability to monitor and analyze the child's progress on a daily basis. The software adaptively adjusts the difficulty of the exercises to be just one small step away from the child's level (not too easy and not too difficult). The invention includes exercises specially designed to improve a child's ability to integrate multiple cues. Such training transfers, over time, to the acquisition of a full syntactic language, and ultimately to the individual's ability to engage with the world and lead a productive, independent life.

An embodiment is a method of improving cognitive abilities of a user, the method comprising: providing at least one screen, wherein the at least one screen is capable of displaying objects, wherein the objects are selectable by the user, and wherein each object has a set of visible properties, each property set to a value, forming a set of property-value pairs for the object; wherein the at least one screen is capable of displaying slots, wherein the slots are selectable by the user, and wherein each slot is assigned the same set of visible properties, each property set to a value, forming a set of property-value pairs for the slot; displaying at least one object with a first set of property-value pairs; displaying at least one slot with a second set of property-value pairs; user's inputs into a computer a user's decision whether the first set and the second set match; the computer indicating to the user whether the user's decision is correct or incorrect.

In another embodiment the properties include at least one of: shape, size, color, pattern, image.

In another embodiment the user's decision that the first set and the second set match is indicated by the user dragging the object onto the slot.

Another embodiment includes providing to the user visual indications of whether during the dragging the object is hovering over a slot with a set of property-value pairs matching the first set of property-value pairs.

Another embodiment includes displaying several objects, each object with a different set of property-value pairs.

Another embodiment includes displaying several slots, each object with a different set of property-value pairs.

Another embodiment includes calculating a score based on the number of correct and incorrect decisions.

Another embodiment includes adjusting the number of objects and/or number of slots and/or number of property-value pairs and/or the size of the objects and/or similarity of slots according to the number of correct and incorrect decisions.

Another embodiment is used for improving cognitive function of users with autism, Down syndrome, PDD, ADHD, language delay, intellectual disabilities, neurological disorders, aphasia, dementia, Alzheimer's, and stroke.

Another embodiment includes method of improving cognitive abilities of a user, the method comprising: providing at least one screen, wherein at least one screen is capable of displaying objects, wherein the objects are selectable by the user, and wherein each object has a set of visible properties, each property set to a value, forming a set of property-value pairs for the object; providing a computer capable of generating verbal specifications of a set of visible properties, each property set to a value, forming a set of property-value pairs for the specification; displaying at least one object with a first set of property-value pairs; displaying the text or playing the sound of at least one verbal specification with a second set of property-value pairs; user's inputs into a computer a user's decision whether the first set and the second set are the same; the computer indicating to the user whether the user's decision is correct or incorrect.

In another embodiment the properties include at least one of: shape, size, color, pattern, image.

In another embodiment the user's decision that the first set and the second set match is indicated by the user selecting the object.

Another embodiment includes displaying several objects, each object with a different set of property-value pairs.

Another embodiment includes calculating a score based on the number of correct and incorrect decisions.

Another embodiment includes adjusting the number of objects and/or number of property-value pairs and/or the size of the objects according to the number of correct and incorrect decisions.

Another embodiment may be used for improving cognitive function of users with autism, Down syndrome, PDD, ADHD, language delay, intellectual disabilities, neurological disorders, aphasia, dementia, Alzheimer's, and stroke.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention.

FIG. 5 shows how puzzles increase in difficulty over time by increasing the number of cues to attend to.

DETAILED DESCRIPTION OF THE PREFERRED EMBODIMENTS

Figure 1A:
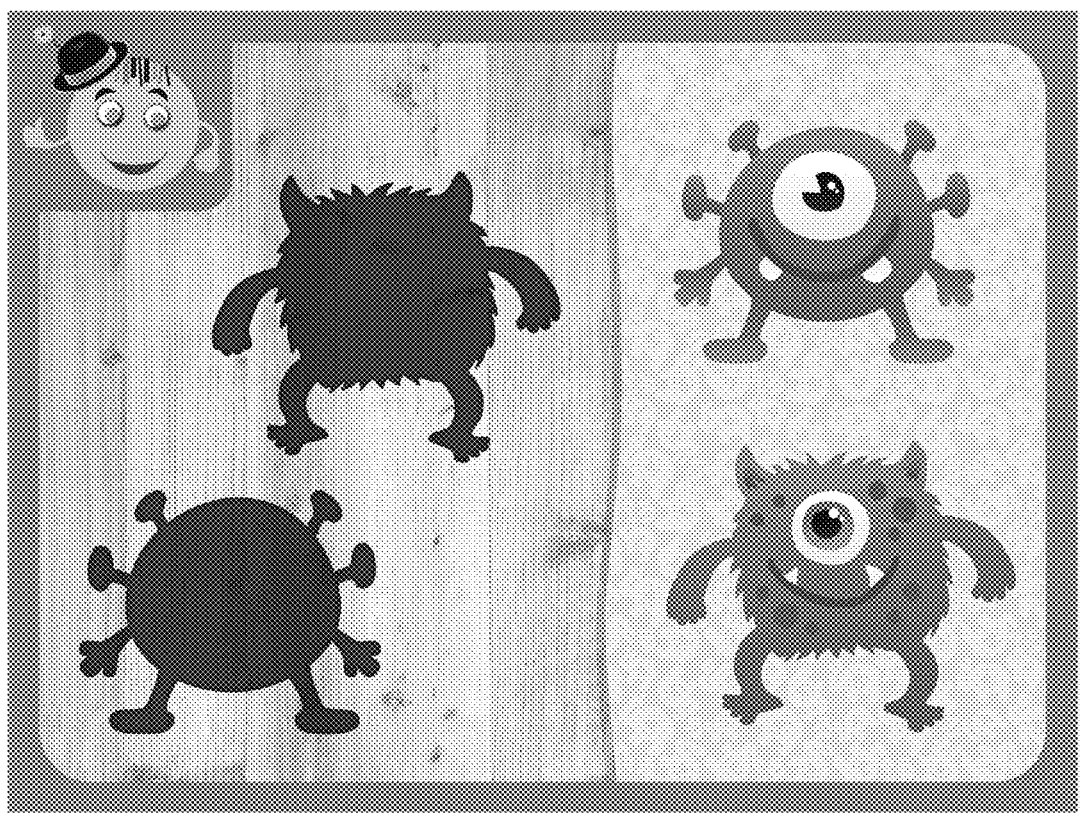
FIG. 1A is an example of an exercise requiring attention to only one cue—shape.

There is a broad consensus that early intervention has the greatest chance of positive impact on an individual with ASD. One embodiment is a computerized brain-training program for toddlers and preschoolers to change their developmental trajectory including game-like exercises that train a child to notice and respond to multiple cues. This ability is typically impaired in individuals with autism, leading to what is commonly described as stimulus overselectivity, or tunnel vision. Improving the capacity to discern and to respond to multiple cues reduces stimulus overselectivity subsequently leading to vast improvements in general learning. Regular, prolonged practice with such exercises results not only in a greater ability to attend to multiple cues, but also in vast improvements in transfer tasks measuring visuospatial as well as communicative skills. This can be used to reduce the gap between the amount of therapy recommended for children with ASD and the amount they actually receive.

Given the indications that children with ASD spend a large amount of time playing video games, and given the broad consensus that children with ASD can benefit greatly from extensive behavioral therapy, some embodiments leverage computerized brain training and provide a tablet-based therapeutic application as a means of reducing the therapy gap. These embodiments drastically reduce the gap between the amount of therapy recommended and the amount of therapy actually received by children with ASD as well as to improve the quality of care.

Some embodiments use Mental Imagery Therapy for Autism (MITA) based on Pivotal Response Treatment (PRT). MITA develops one of the four pivotal skills targeted by PRT: a child's ability to notice and to respond to multiple cues presented simultaneously. To understand this ability, imagine that you are asked to pick up a red crayon that has fallen under the table. This may seem like a trivial task, but in order to accomplish it successfully, you need to notice three different features, or "cues," of the object: its color (red), its shape (crayon) and its location (under the table). You must then mentally integrate all three pieces of information into a new mental image, a red crayon under the table, in order to take the correct action. One such pivotal skill is the ability to respond to multiple cues presented simultaneously (the other pivotal skills include motivation, self-management, and child self-initiations).

The ability to respond to multiple cues decreases stimulus overselectivity and leads to improvements in general learning.

MITA includes educational exercises in an engaging format specifically intended for early childhood, MITA, with its large collection of exercises bolstered by an adaptive algorithm that is responsive to the individual abilities of each child, is designed to be appropriate for daily use over an extended period of time. The regular, prolonged practice over the course of at least two years with the MITA application will result not only in a greater ability to attend to multiple cues and in a reduction in stimulus overselectivity, but will also lead to vast improvements of transfer tasks measuring visuospatial as well as communicative skills.

Figure 1B:
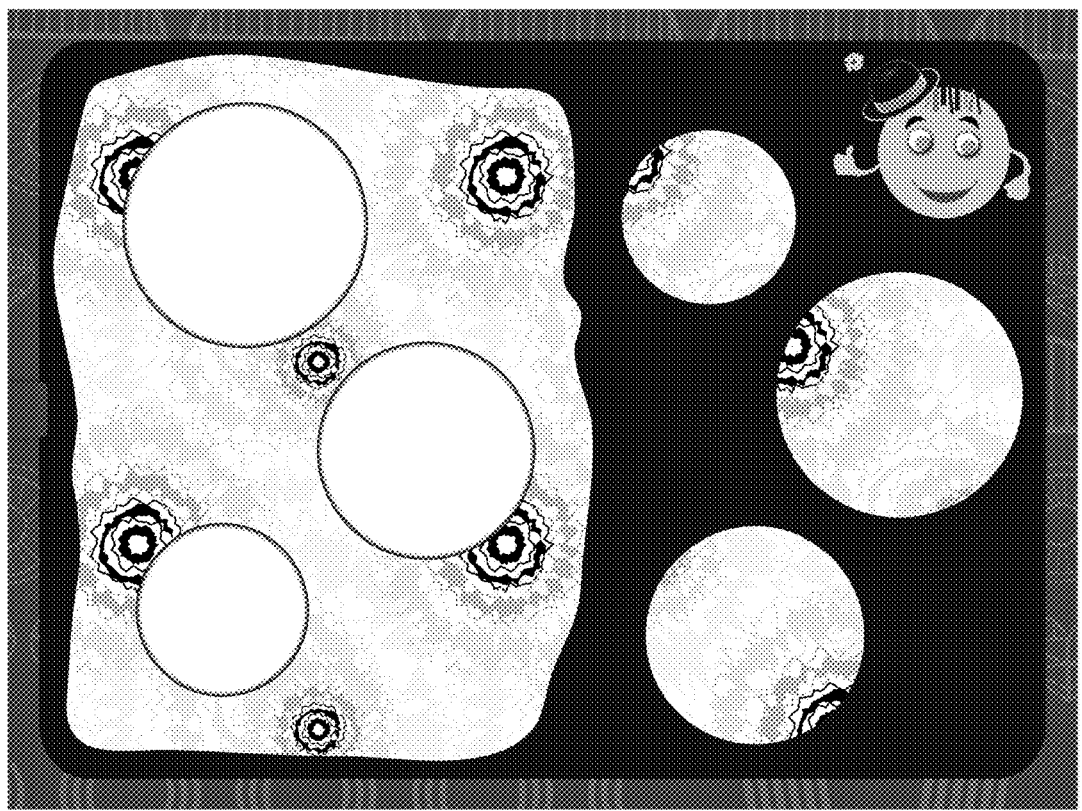
FIG. 1B is an example of an exercise requiring attention to only one cue—size.
Figure 1C:
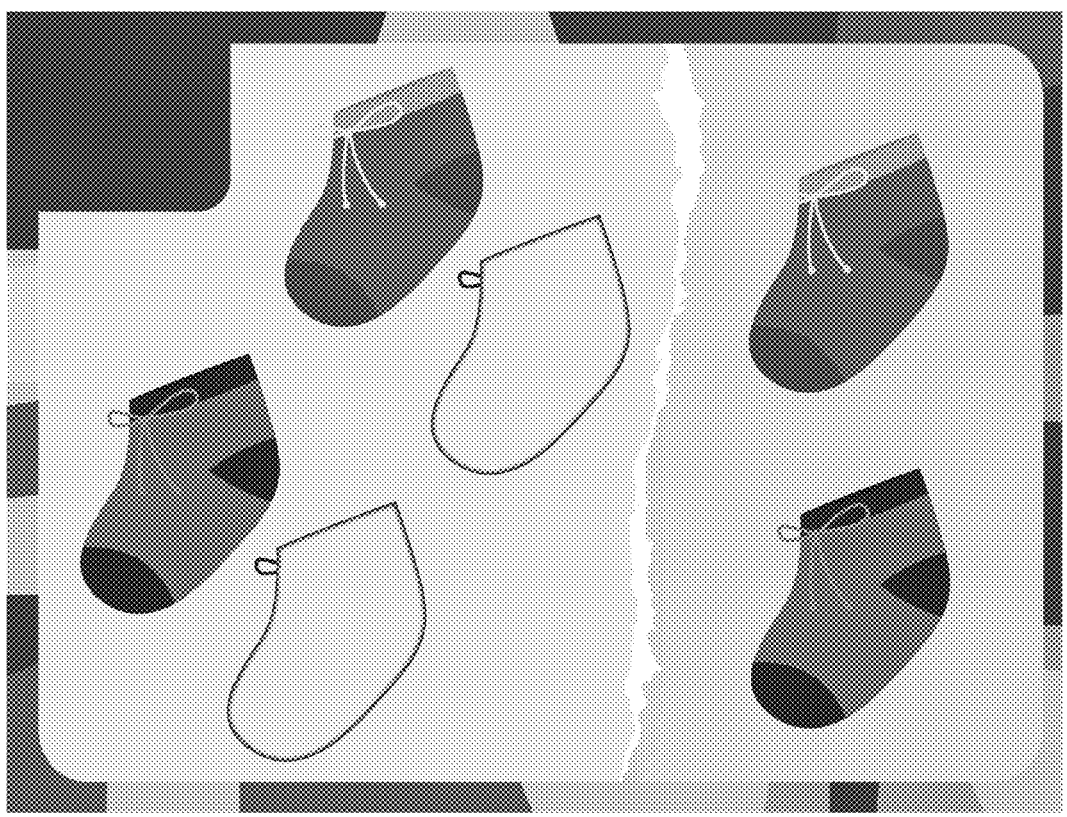
FIG. 1C is an example of an exercise requiring attention to only one cue—color.
Figure 1D:
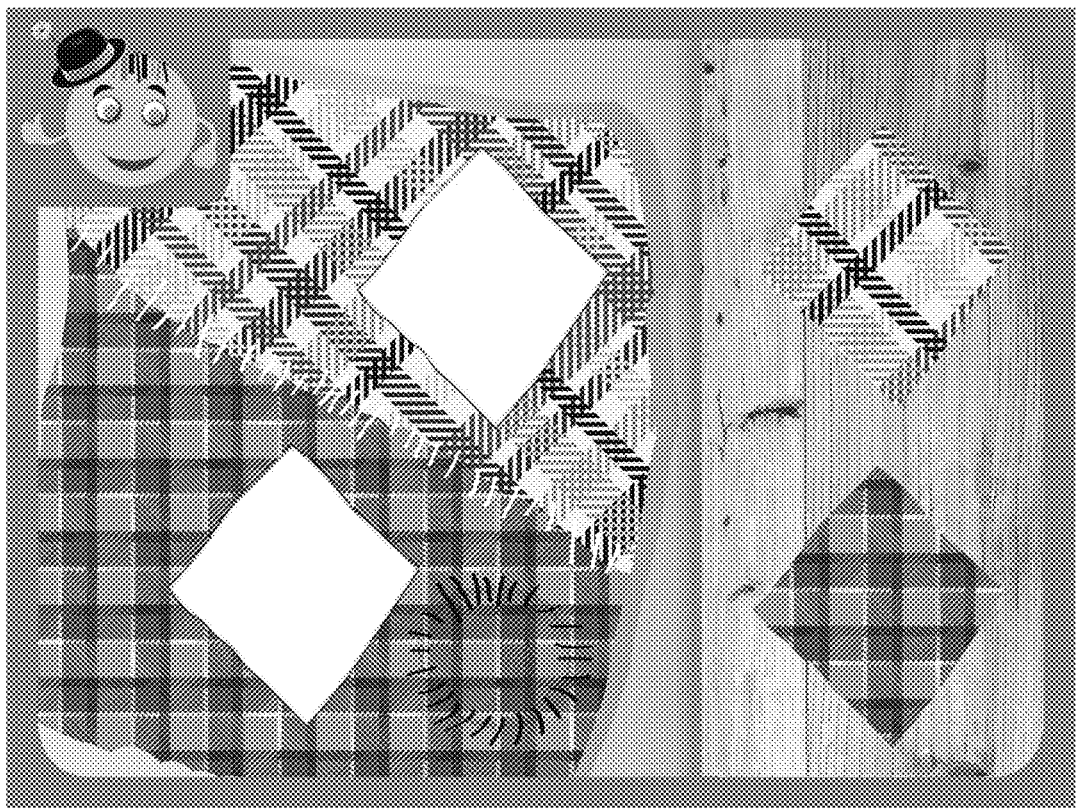
FIG. 1D is an example of an exercise requiring attention to only one cue—pattern.

The MITA program follows a systematic approach for developing a child's ability to respond to multiple cues, starting with very simple exercises that require attending to only one cue or characteristic. The program starts by presenting very simple exercises that require attending to only one cue or characteristic, namely shape (FIG. 1A), size (FIG. 1B), color (FIG. 1C), or pattern (FIG. 1D). To solve a puzzle, a child needs to drag all movable pieces shown on the right side of each screenshot into their correct positions on the left side of the screen.

Figure 2A:
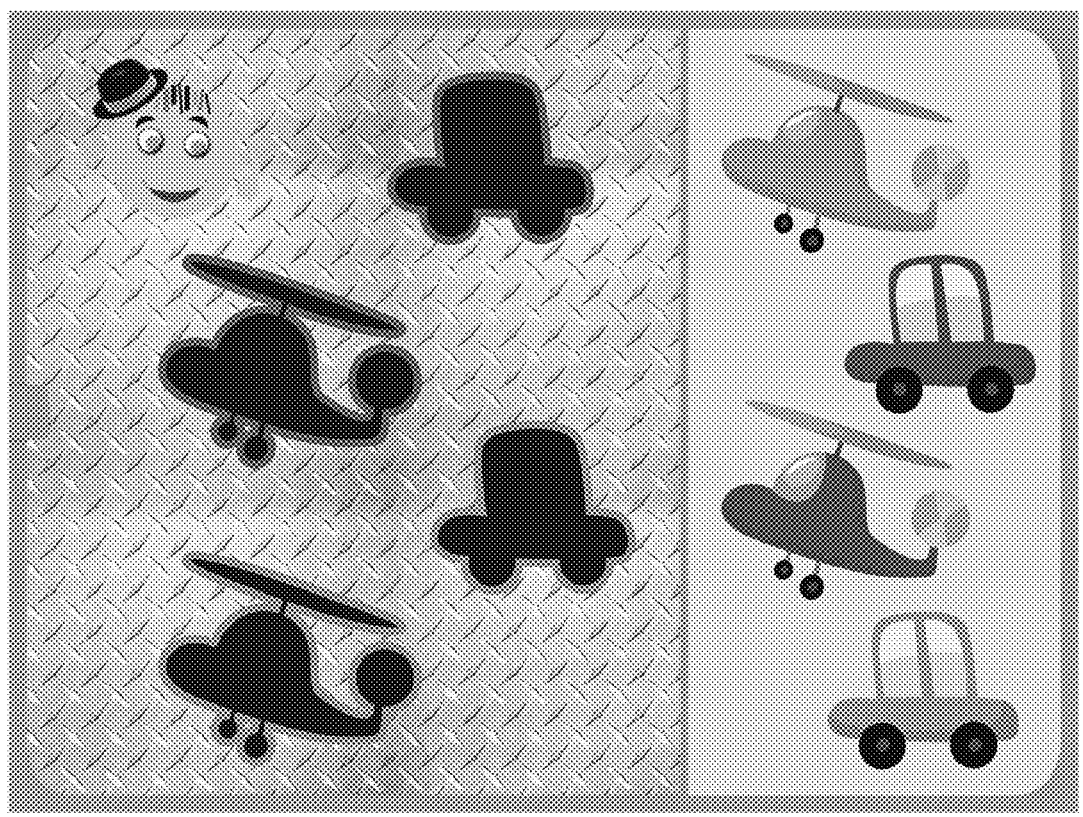
FIG. 2A is an example of an exercise requiring attention to two cues simultaneously—color and shape.
Figure 2B:
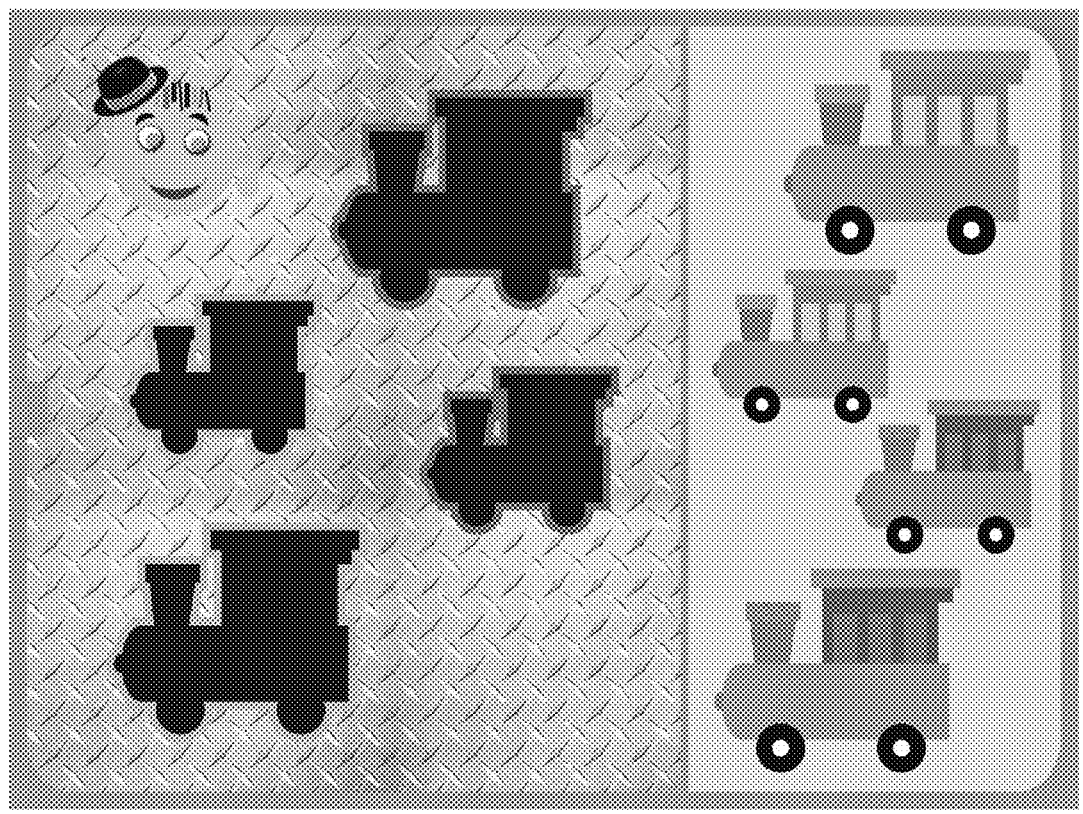
FIG. 2B is an example of an exercise requiring attention to two cues simultaneously—color and size.
Figure 3:
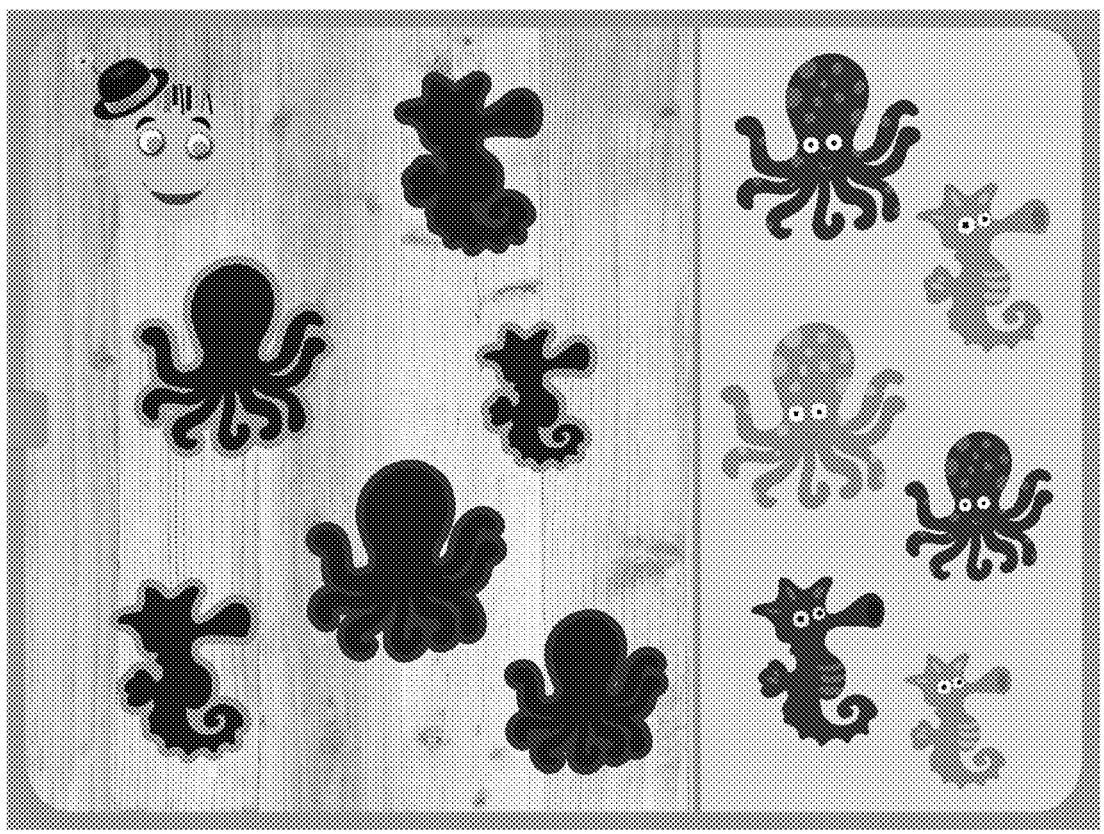
FIG. 3 is an example of an exercise requiring attention to three cues—color, shape, and size.

Once a child shows competence at attending to one cue, the program presents the child with exercises that require the child to attend to two cues simultaneously. FIG. 2 shows exercises in which a child needs to simultaneously attend to two cues in order to match each object with its proper location: color and shape (FIG. 2A) and color and size (FIG. 2B). For example, in FIG. 2A, when determining where to place the red helicopter, only noticing its shape would be insufficient since there are two helicopter silhouettes; only noticing its color would be equally insufficient since there are two red silhouettes. The child must learn how to hold two pieces of information in the mind ("red" and "helicopter") and make a decision based on both cues. Over time, the exercises increase in difficulty, requiring the child to attend to a greater number of cues. FIG. 3 shows an exercise in which a child must attend to an object's color, shape, and size.

Figure 4:
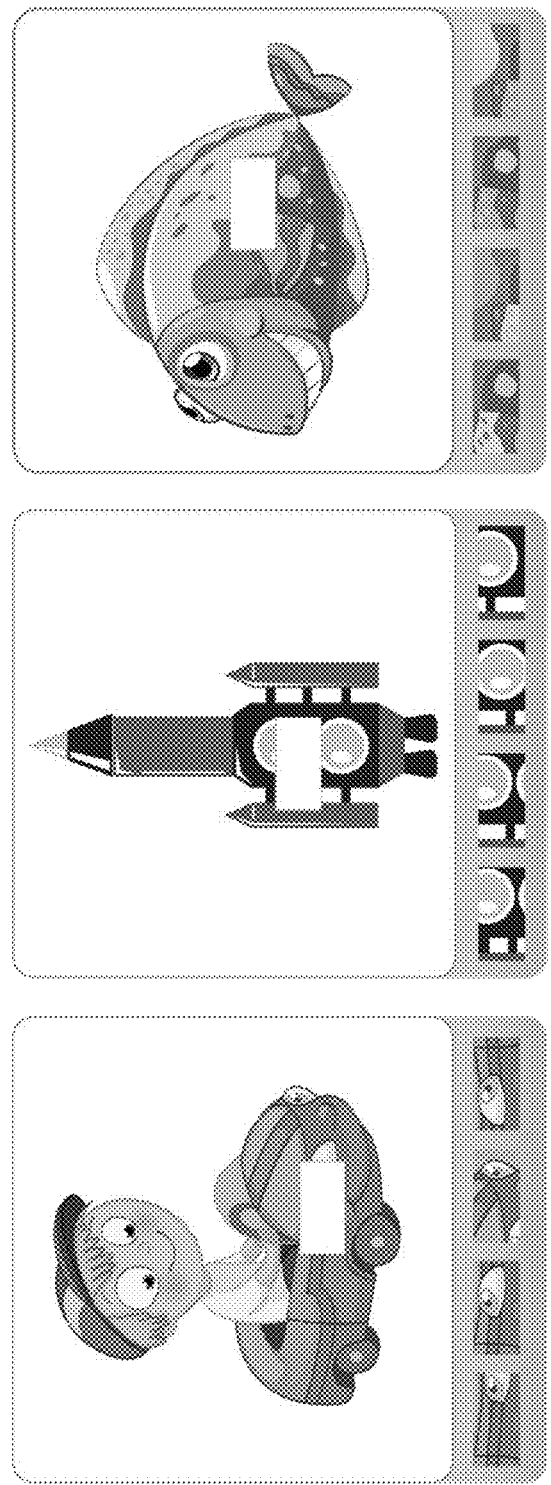
FIG. 4 is an example of an exercise requiring attention to multiple cues.

The most complex exercises require a child to attend to a whole variety of visual cues simultaneously, such as the "missing patch" puzzles shown in FIG. 4. The success in solving these and similar puzzles depends on a child's ability to simultaneously take into account a whole variety of visual cues, including multiple colors and various shapes. As a child progresses through MITA's systematic exercises, he or she is developing the ability to simultaneously notice and integrate a greater number of visual cues.

Figure 5:
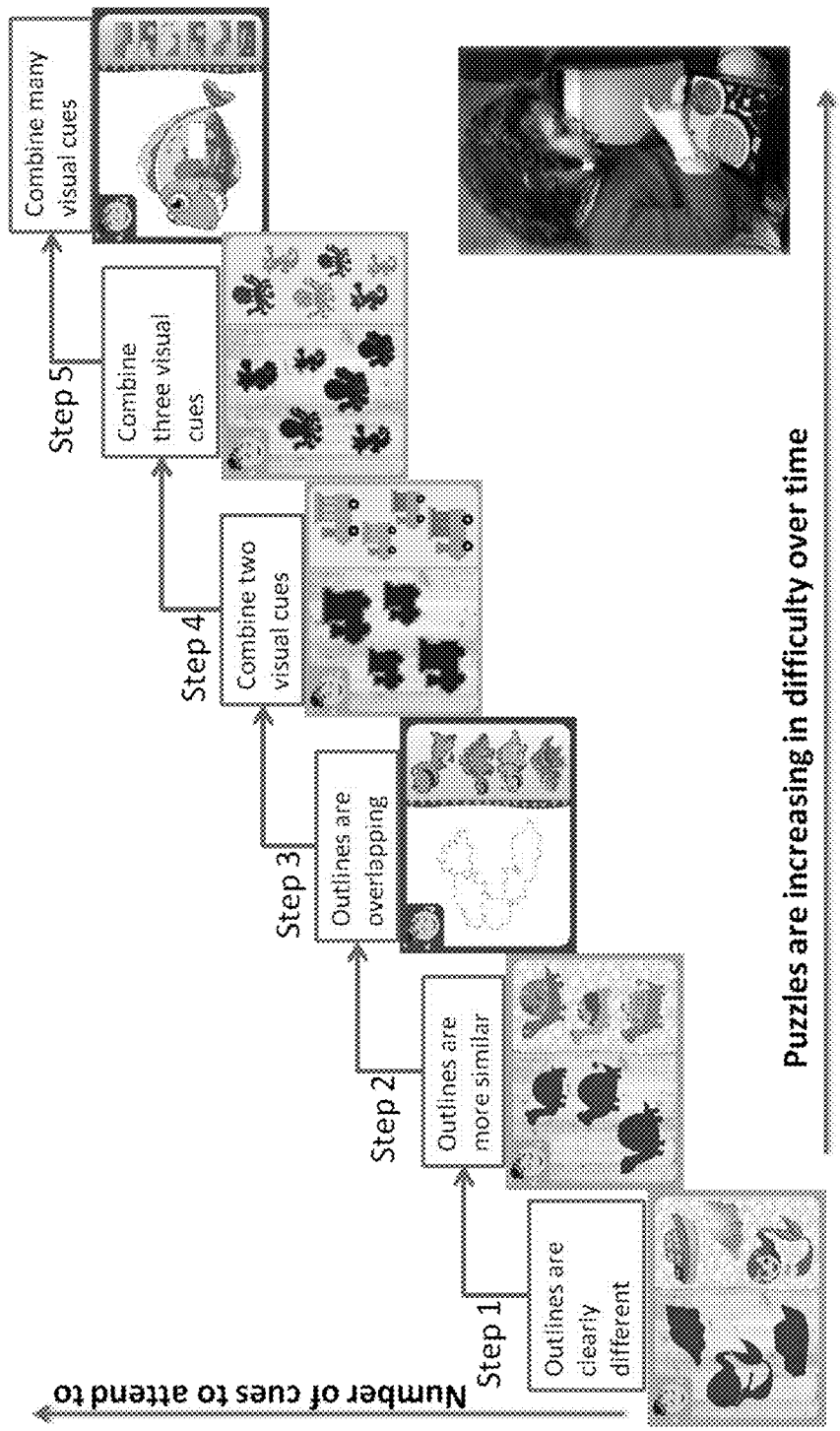

The puzzles train responsiveness to multiple cues without the need of a verbal command or verbal instructions. This delivers successful therapy even to kids who are completely nonverbal. The visual nature of MITA puzzles allows the steps between successively more demanding tasks to be much smaller, resulting in a more gradual learning curve (FIG. 5). Such a fine gradient between successively more demanding tasks is only possible in the visual domain, since the necessary objects would require an overabundance of words to describe.

The software is designed to require minimal instruction and explanation; it works as a facilitator. Kids work independently to figure out the solution without verbal instruction, an approach that is ideal for the development of other pivotal skills: motivation and self-initiation. MITA creates a nonverbal way for kids to develop responsiveness to multiple cues in an environment that encourages self-motivated and self-initiated progress. These critical skills are acquired in a fun-filled, game-like environment with kids being unaware that they are self-administering Pivotal Response Treatment.

MITA exercises are feasible for early childhood, for children as young as two years of age, and could be used as soon as a diagnosis is made.

MITA puzzles are designed to be accessible to users with minimal fine-motor skills: (a) the puzzles use large, easy-to-drag images; (b) once a child touches an image, that image is slightly expanded in order to provide the child with clear visual feedback that he or she is actually holding the image; (c) for children who repeatedly experience motor difficulties, optional settings, such as tap-to-solve instead of drag-to-solve, were developed to simplify actions within a puzzle; (d) the adaptive algorithm was specifically designed not to penalize for minor motor mistakes.

MITA puzzles maximize attention on the given task and to minimize all distractors. Once a child starts working on a solution, there are no elements within the puzzle that move.

MITA puzzles utilize a variety of prompts: an image of a hand pointing to the correct object, the correct object highlighted/flashing on the screen, an auditory command, etc. In addition, the program adheres to common ABA prompt-fading strategies that follow the most-to-least (used when a student is first learning a skill) and least-to-most (used when a child has previously demonstrated success with a task) hierarchy.

A collection of puzzles is appropriate for a wide range of ages and abilities. A methodology automatically determines the difficulty of a particular puzzle. The level of difficulty in a matching-scheme puzzle is determined by: (a) the similarity of the options (a feature we call "span") and (b) the number of options.

The span is the count of the number of features that differ between two items. For example, if two ice cream combinations differ in four categories, they have a span of 4.

Figure 6:
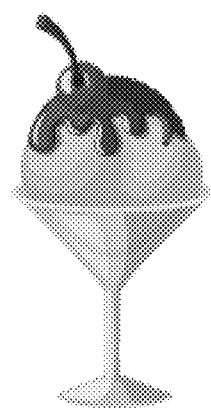
FIG. 6 shows a matching puzzle with 2 options, and span of 2.
Figure 6:
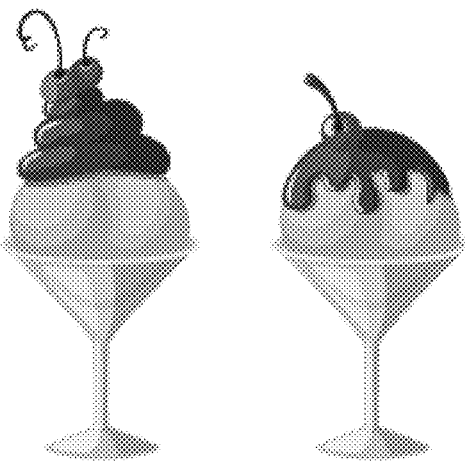

In a task where the goal is to choose the option that matches the target, an easier puzzle (FIG. 6) requires a player to attend to either one of the differing features in order to choose correctly. In this case there are only 2 features that separate the options (sauce and topping), so the puzzle has a span of 2.

Figure 7:
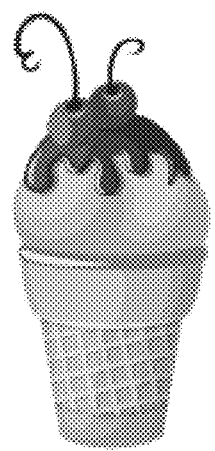
FIG. 7 shows a more difficult matching puzzle with 3 options, and span of 1.
Figure 7:
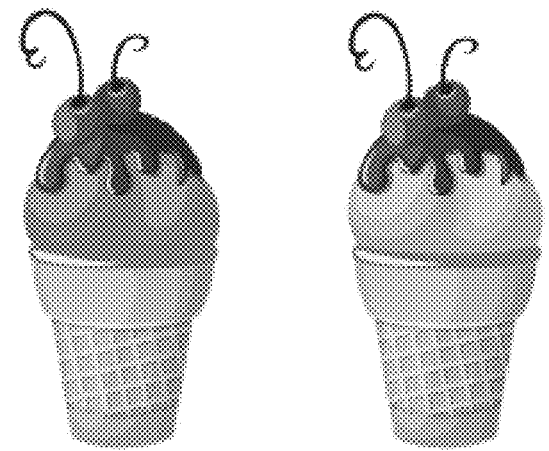

As the span decreases, and the number of options increases, the matching task becomes more difficult and requires the player to pay closer attention. For example, adding a third option (FIG. 7) with only one feature separating each one of the three options from the target (span of 1), necessitates that the player attends to two cues simultaneously (both the color of the ice cream and the topping). A system that tracks both the span as well as the number of options presented to the player can precisely calibrate the difficulty level of each task resulting in tasks appropriate for a wide range of abilities.

The app in some embodiments will reduce puzzle difficulty as soon as it algorithmically determines that a child is using trial-and-error. Since the solution of every puzzle carries some labor cost (dragging of dynamic objects into a correct slot), it is energetically easier to solve puzzles mentally and intentionally, without relying on the relatively inefficient trial-and-error. The program provides immediate positive feedback, both visual and auditory, for every successful drag-and-drop and an immediate negative audio and visual feedback for every unsuccessful trial. If the algorithm determines that a child is using more trial-and-error towards the end of a session, it reduces the session duration. For some children several shorter sessions are easier than a single 15-minutes session. If a child is using more trial-and-error at the beginning of a session, the algorithm ensures that each session begins with puzzles that are easy enough for the child to solve without having to resort to trial-and-error.

In some embodiments, as the child solves puzzles, the puzzles become progressively more difficult. The algorithm continually adjusts the balance between on the one hand side keeping a child motivated to first solve a puzzle mentally and only then play out the solution on an iPad by moving the dynamic objects into their target spots and on the other hand increasing the puzzles difficulty level. This balance is determined by an algorithm that identifies instances of trial-and-error. The instances of trial-and-error include dropping a dynamic object onto a possible target and hovering (trying) a dynamic object over any possible targets. For example, for every dynamic object, a child is using hovering if dragging duration is greater than 3500 ms and time hovering over any targets is greater than 65% of dragging duration; or if dragging duration is greater than 2500 ms and time hovering over any targets is greater than 70% of dragging duration; or if dragging duration is greater than 2000 ms and time hovering over any targets is greater than 80% of dragging duration; for the first dynamic object, a child is using hovering if dragging duration is greater than 2500 ms and time hovering over any targets is greater than 60% of dragging duration and the dragging duration is three times or more greater than the dragging duration of the last object. The number of hoverings and the number of incorrect drops are calculated for each puzzle and used in determining the puzzle's score. For example, a child starts each puzzle with the score of five. For every detected trial-and-error (hovering or incorrect drop), the program subtracts one point. An average score is then calculated for the 5 puzzle-bundle. The puzzles increase in difficulty if the user maintains the average score of 4.5 or higher. The puzzles reduce in difficulty if the user's average score is below 4. The puzzles maintain their difficulty if the user's average score is between 4 and 4.5.

The software in some embodiments creates the puzzles automatically and algorithmically from the pre-existing image bank. There is no need to painstakingly create each puzzle separately. The advantages of this approach are:

(a) faster creation of a large number of puzzles. For example, creating 5 different bottoms, 5 bottom scoops, 5 top scoops, and 5 toppings, gives us 625 different ice creams. On top of that, the difficulty of each individual puzzle vary based on the dynamic objects that pop up as the choices (if they are very different looking, then it's an easy-puzzle, if they are very similar looking, then it's a difficult puzzle). So each of the 625 different ice cream puzzles can be easy, medium or difficult, giving us 1875 different levels;

(b) puzzles that actually adjust to the child's ability. Instead of having pre-made bundles for each difficulty level, the game proceeds based on the child's abilities. Each child will start with five level 1 (easy) puzzles, and then either proceed to 5 level 0 puzzles (if the child got 0 or 1 correct out of the first 5) or to another set of 5 level 1 puzzles (if the child got 2 or 3 correct out of the first 5), or advance to 5 level 2 puzzles (if the child got 4 or 5 correct out of the first 5);

(c) The low file size of the software product because one game consists only 20 different objects (that can all be recombined) resulting in 1875 different variations;

(d) The game is different every time the child enters it (which encourage children to play again and again). Since there is no need for the "set of five" to be fixed, the program can pick any five puzzles out of a pool of puzzles that are similarly ranked by difficulty.

The systematic, computerized training is the best way to train a child's ability to respond to multiple cues, an ability that has been shown to lead to vast improvements in general learning. The regular practice with the MITA application results not only in a greater ability to attend to multiple cues, but also in vast improvements of transfer tasks measuring visual-spatial as well as communicative skills.

MITA, coupled with an effective vocabulary training program, leads to improvements in the realm of language comprehension. Children who begin training at an early age, and who make consistent progress over the course of training, will see drastic improvements in their language function. Since many kids diagnosed with ASD are already receiving ample vocabulary training, what's missing is the skill to attend to various combinations of learned words, which is the backbone of true language comprehension. For example, a child who has learned the words "red" and "crayon" but who cannot attend to both cues, will struggle to pick out a "red crayon" from an array of objects, while a similar child who has learned to respond to multiple cues will likely be successful with the task. Combining the ability to respond to multiple cues with vocabulary knowledge results in an understanding of a full syntactic language, and leads to a significant reduction of the severity of the ASD diagnosis and ultimately to a more productive and independent life.

While this invention has been particularly shown and described with references to preferred embodiments thereof, it will be understood by those skilled in the art that various changes in form and details may be made therein without departing from the scope of the invention encompassed by the appended claims.

The invention claimed is:
1. A method of improving cognitive abilities of a user, the method comprising:
   providing at least one screen,
     wherein the at least one screen is capable of displaying objects,
     wherein the objects are selectable by the user, and wherein each object has the same set of N visible non-textual settable properties, each property set to a non-textual value, forming a set of N property-value pairs for the object;

providing a computer capable of generating verbal specifications of a set of N visible non-textual properties, each property set to a non-textual value, forming a set of N property-value pairs for the specification;

displaying a plurality of selectable objects, each object with a different set of N property-value pairs, comprising a first object with a first set of N property-value pairs;

providing to the user a verbal specification of a second set of N property-value pairs by displaying the text or playing the sound of the verbal specification to the user, wherein the same plurality of selectable objects is displayed throughout providing the user with the specification;

inputting by the user into a computer a user decision whether the first set and the second set are the same; and the computer indicating to the user whether the user decision is correct or incorrect, wherein N is equal to or greater than three and wherein the user decision that the first set and the second set match is indicated by the user selecting the object.

2. The method of claim 1, wherein the properties include at least one of: shape, size, color, pattern, image.

3. The method of claim 1, further comprising calculating a score based on the number of correct and incorrect decisions.

4. The method of claim 1, further comprising adjusting the number of objects and/or number of property-value pairs and/or the size of the objects according to the number of correct and incorrect user decisions.

5. The method of claim 1, wherein the providing to the user the verbal specification of the second set of N property-value pairs comprises playing the sound of the verbal specification to the user.

* * * * *